US008370817B2

(12) United States Patent
Eichenberger et al.

(10) Patent No.: US 8,370,817 B2
(45) Date of Patent: Feb. 5, 2013

(54) OPTIMIZING SCALAR CODE EXECUTED ON A SIMD ENGINE BY ALIGNMENT OF SIMD SLOTS

(75) Inventors: Alexandre E. Eichenberger, Chappaqua, NY (US); John Kevin Patrick O'Brien, South Salem, NY (US)

(73) Assignee: International Business Machines Corporation, Armonk, NY (US)

( * ) Notice: Subject to any disclaimer, the term of this patent is extended or adjusted under 35 U.S.C. 154(b) by 1289 days.

(21) Appl. No.: 12/127,491

(22) Filed: May 27, 2008

(65) Prior Publication Data

US 2008/0222391 A1    Sep. 11, 2008

Related U.S. Application Data

(63) Continuation of application No. 11/339,591, filed on Jan. 25, 2006.

(51) Int. Cl.
*G06F 9/45* (2006.01)
*G06F 15/00* (2006.01)

(52) U.S. Cl. ........ 717/136; 717/140; 717/143; 717/144; 717/151; 717/159; 712/3; 712/22

(58) Field of Classification Search ........................ None
See application file for complete search history.

(56) References Cited

U.S. PATENT DOCUMENTS

| 4,888,682 | A * | 12/1989 | Ngai et al. ........................ 712/4 |
| 7,516,299 | B2 | 4/2009 | Citron et al. |
| 2004/0064810 | A1 | 4/2004 | Wang et al. |
| 2007/0174825 | A1 | 7/2007 | Eichenberger et al. |

OTHER PUBLICATIONS

Eichenberger et al., "Efficient simd code generation for runtime alignment and length conversion," IEEE, 2005.*
U.S. Appl. No. 11/339,591.
Eichenberger, Alexandre E. et al., "Vectorization for SIMD Architectures with Alignment Constraints", ACM SIGPLAN Notices, vol. 39, Issue 6, May 2004, pp. 82-93.
Final Office Action mailed Nov. 23, 2010 for U.S. Appl. No. 11/339,591; 10 pages.
Interview Summary mailed Sep. 8, 2010 for U.S. Appl. No. 11/339,591; 4 pages.
Final Office Action mailed Feb. 25, 2011 for U.S. Appl. No. 11/339,591; 9 pages.
Interview Summary mailed Jan. 28, 2011 for U.S. Appl. No. 11/339,591; 4 pages.
Response to Final Office Action filed Jan. 21, 2011, U.S. Appl. No. 11/339,591, 13 pages.
Reply Bried filed Dec. 1, 2011, U.S. Appl. No. 11/339,591, 6 pages.

* cited by examiner

*Primary Examiner* — Insun Kang
(74) *Attorney, Agent, or Firm* — Francis Lammes; Stephen J. Walder, Jr.; Matthew B. Talpis (57) ABSTRACT

A mechanism is provided for optimizing scalar code executed on a single instruction multiple data (SIMD) engine by aligning the slots of SIMD registers. With the mechanism, a compiler is provided that parses source code and, for each statement in the program, generates an expression tree. The compiler inspects all storage inputs to scalar operations in the expression tree to determine their alignment in the SIMD registers. This alignment is propagated up the expression tree from the leaves. When the alignments of two operands in the expression tree are the same, the resulting alignment is the shared value. When the alignments of two operands in the expression tree are different, one operand is shifted. For shifted operands, a shift operation is inserted in the expression tree. The executable code is then generated for the expression tree and shifts are inserted where indicated.

15 Claims, 5 Drawing Sheets

OPTIMIZING SCALAR CODE EXECUTED ON A SIMD ENGINE BY ALIGNMENT OF SIMD SLOTS

This application is a continuation of application Ser. No. 11/339,591, filed Jan. 25, 2006, status pending.

BACKGROUND

1. Technical Field

The present application relates generally to an improved data processing apparatus and method. More specifically, the present application is directed to an apparatus and method for optimizing scalar code executed on a single instruction multiple data (SIMD) engine by aligning SIMD slots of SIMD registers.

2. Description of Related Art

On an autonomous single instruction multiple data (SIMD) engine with no scalar instructions, all scalar code must be executed in SIMD registers. Since scalar data may be placed in storage on different alignment boundaries, in general the operands for a scalar operation may not be placed in congruent slots by the load instructions of the SIMD processor. That is, one scalar operand may be in slot 3 while another scalar operand may be in slot 2 of the SIMD registers. This causes a problem with scalar operations being performed in SIMD registers because congruent slots in SIMD registers are combined to perform an operation. If the operands are not in congruent slots, the operands of the scalar operation will not be properly combined.

Figure 1A:
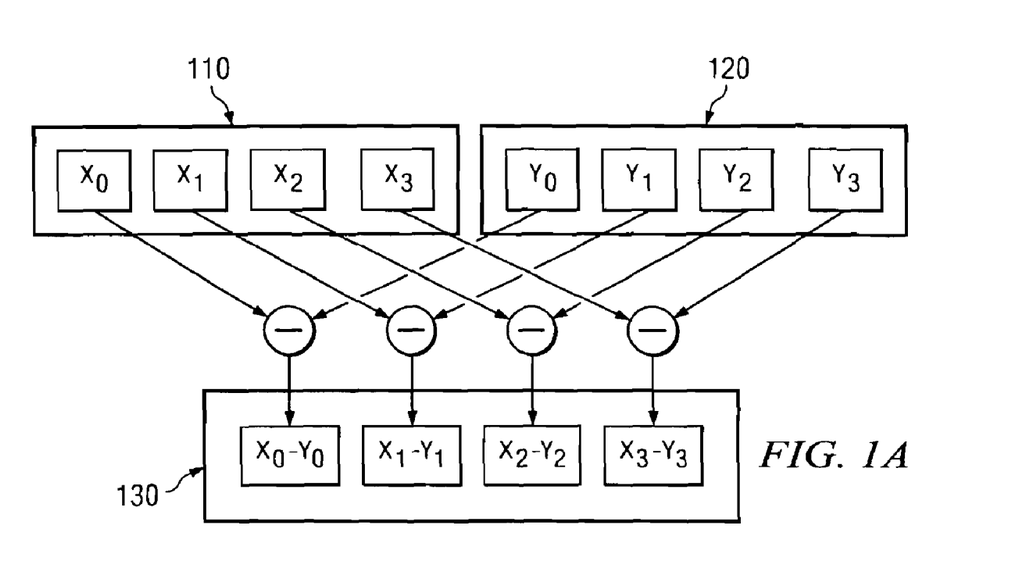
FIGS. 1A-1C are exemplary diagrams illustrating SIMD registers and performing computational operations using SIMD registers.
Figure 1B:
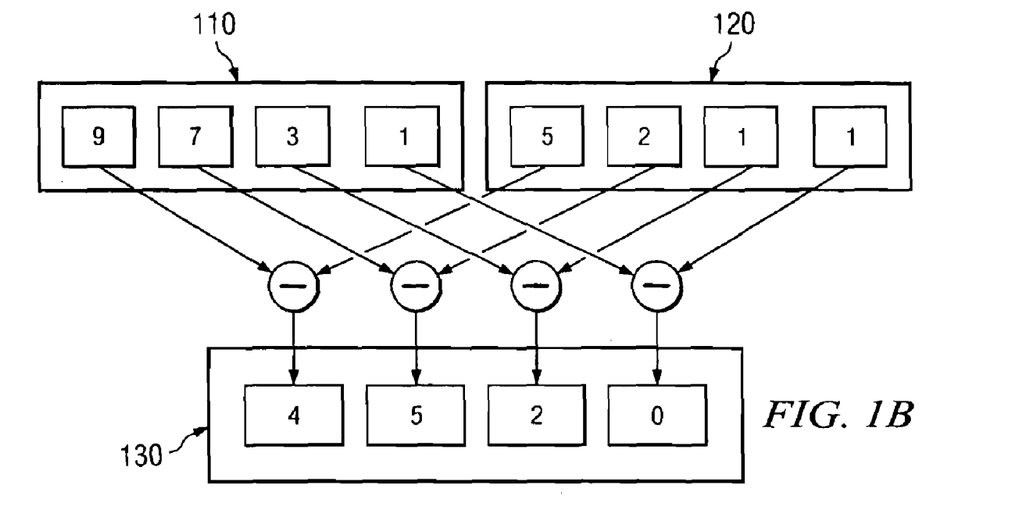
Figure 1C:
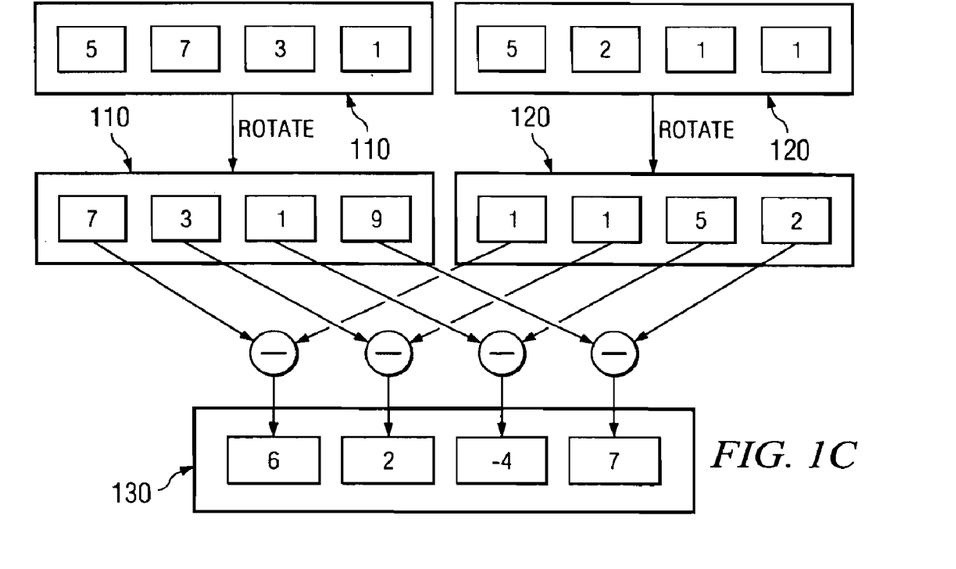

To illustrate this problem, examples of SIMD registers are shown in FIGS. 1A-1C. As shown in FIG. 1A, a first SIMD register 110 stores values x0-x3 in slots 0-3, respectively. A second SIMD register 120 store values y0-y3 in slots 0-3, respectively. The values in SIMD registers 110 and 120 are combined and stored in SIMD register 130. In the depicted example, the y0-y3 values are subtracted from the x0-x3 values to generate the resultant values (x0-y0) to (x3-y3) in SIMD register 130.

As can be seen from FIG. 1A, with SIMD registers, operand values in congruent slots in the SIMD registers are combined to generate results that are stored in a congruent slot in a resultant SIMD register. Since scalar operands are comprised of a single value, and not multiple values as with vector operands, when a scalar operand is loaded into a SIMD register, the scalar operand is loaded along with other values that are not used in the scalar operation. Due to alignment boundary differences or other factors, the scalar operand may be present in any one of the multiple slots of the SIMD register. Thus, if two scalar values are to be subtracted, a first scalar value may be stored in slot 1 of a first SIMD register 110 and a second scalar value may be stored in slot 2 of a second SIMD register 120. Such a situation is illustrated in FIG. 1B.

As shown in FIG. 1B, a scalar operation that is to be performed, in this simple example, is the subtraction of the scalar operand value "1" from the scalar operand value "7." However, because the scalar operands are misaligned, i.e. scalar operand value "7" is in slot 1 of SIMD register 110 and scalar operand value "1" is in slot 2 of SIMD register 120, this scalar operation cannot be performed with the current alignment of values in the SIMD registers 110 and 120.

The simple solution to this problem is to always shift scalars to a preferred slot before execution of a computational operation on them and, if required, to shift the result back to the appropriate slot for storage. Shifting of the slots may be achieved by use of a rotation, which shifts the desired slot into the appropriate position, but preserves other data in the register. Shifting may also be achieved by a shuffle operation, which can put the single slot in all positions, essentially a multiple shift, but there may be a small amount of additional overhead in this case.

A rotation solution is shown in FIG. 1C. In the depicted example, the preferred slot is slot 0 and all scalar operand values are shifted (or rotated, as in this example) to slot 0 prior to performing a computational operation on them. For example, the scalar operand value "7" is shifted from slot 1 to slot 0 of SIMD register 110 and the scalar operand value "1" is shifted from slot 2 to slot 0 in SIMD register 120. As a result, when the computational operation, e.g., subtraction, is performed on the slots of the SIMD registers 110 and 120, the proper result "6" is generated and stored in resultant SIMD register 130. An additional shift operation may be performed within SIMD register 130 to move the result to a different slot within SIMD register 130 if required.

While this solution ensures that scalar operations are properly performed in SIMD registers, the solution requires extra processing cycles to perform shift operations. Such shift operations may not be necessary if the scalar operands are properly aligned but just are not in the preferred slot. For example, if both operands are in slot 2 of the SIMD registers 110 and 120, then the solution would still require that they be shifted to slot 0 before the computational operation may be performed. There is no ability to determine whether scalar operands are properly aligned in SIMD registers prior to shifting to a preferred slot in the known solution. All scalar operands must be shifted to the preferred slot in the known solution.

SUMMARY

In view of the above, it would be beneficial to have an apparatus and method for optimizing the execution of scalar operations in a single instruction multiple data (SIMD) processor using SIMD registers. Specifically, it would be beneficial to have an apparatus and method for ensuring accurate performance of scalar computational operations using SIMD registers while minimizing shift operations needed to align scalar operands. The illustrative embodiments provide such an apparatus and method.

With the apparatus and method of the illustrative embodiments, a compiler is provided with an optimization engine that performs selective alignment of scalar operands in SIMD registers through insertion of shift instructions. The compiler parses source code and, for each statement in the program, generates an expression tree. The compiler inspects all storage inputs to scalar operations, if any, in the expression tree, i.e. the leaves, to determine their alignment in the SIMD registers. This alignment is propagated up the expression tree from the leaves.

When the alignments of two operands in the expression tree are the same, the resulting alignment is the shared value. When the alignments of two operands in the expression tree are different, one operand is shifted. For shifted operands, a shift operation is inserted in the expression tree. The executable code is then generated for the expression tree and shifts are inserted where indicated.

Thus, through implementing the illustrative embodiments, those scalar operands that are already aligned may be identified and shifting of the aligned scalar operands may be avoided. Moreover, even for those operands that are not aligned, a subset of the operands need only be shifted rather than shifting all of the scalar operands. As a result, the number of shift operations for aligning scalar operands is minimized. Thus, processor cycles that would be required to align all of the scalar operands in a preferred slot of the SIMD registers are saved by the illustrative embodiments.

In one illustrative embodiment, a method is provided for performing a scalar operation. The method may comprise identifying a scalar operation in source code and generating an expression tree for the scalar operation. The expression tree may have leaf nodes corresponding to scalar operands of the scalar operation. The method may further comprise determining an alignment of the scalar operands in respective registers that store the scalar operands and generating executable code for the scalar operation based on the expression tree and the determined alignment of the scalar operands. The generating of executable code for the scalar operation may comprise inserting shift instructions into the executable code based on the alignment of the scalar operands.

The method may further comprise propagating the alignment of the scalar operands up the expression tree and annotating the expression tree based on the propagation of the alignment of the scalar operands up the expression tree. Annotating the expression tree based on the propagation of the alignment may comprise annotating selected nodes of the expression tree to identify shift operations to be performed with respect to the selected nodes. The shift operations may be determined with reference to all other shift operations within a given region of the source code by means of an optimization process which attempts to find a minimum number of shift operations within the region of the source code. The shift instructions that are inserted into the executable code may be one of rotation shift instructions or shuffle shift instructions.

The optimization process may determine common sub-expressions of scalar operations and shift operations are selected such that for a number of instances of the common sub-expression a same shift operation is utilized. At least one of the shift operations may be a shuffle shift operation that propagates a scalar operand to all positions in a respective register such that the scalar operand may be used with more than one desired alignment.

The selected nodes may be nodes where values associated with two or more child nodes in the expression tree are to be combined and the values have different alignments in their respective registers. Values of the selected nodes may have alignments in their respective resultant registers corresponding to an alignment of the two or more child nodes after shifting is performed.

In other illustrative embodiments, an apparatus and computer program product are provided for implementing the operations described above with regard to the method. The apparatus may comprise a processor and a memory having instructions provided therein that, when executed by the processor, cause the processor to perform the various operations described above. The computer program product may comprise a computer usable medium having a computer readable program provided thereon. When the computer readable program is executed by a computing device, the computer readable program may cause the computing device to perform the various operations described above with regard to the method.

These and other features and advantages of the present invention will be described in, or will become apparent to those of ordinary skill in the art in view of, the following detailed description of the exemplary embodiments of the present invention.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENTS

The illustrative embodiments provide an apparatus and method for optimizing scalar code executed on a single instruction multiple data (SIMD) engine by aligning SIMD slots of SIMD registers. As such, the illustrative embodiments may be implemented in any data processing system using a SIMD engine and SIMD registers. One such data processing system is the Cell Broadband Engine (CBE) data processing system available from International Business Machines, Inc. or Armonk, N.Y. The CBE architecture will be used as a basis for the description of the illustrative embodiments. However, it should be appreciated that the CBE architecture is only illustrative and is not intended to state or imply any limitation with regard to the types of data processing systems or architectures in which the illustrative embodiments may be implemented.

Figure 2:
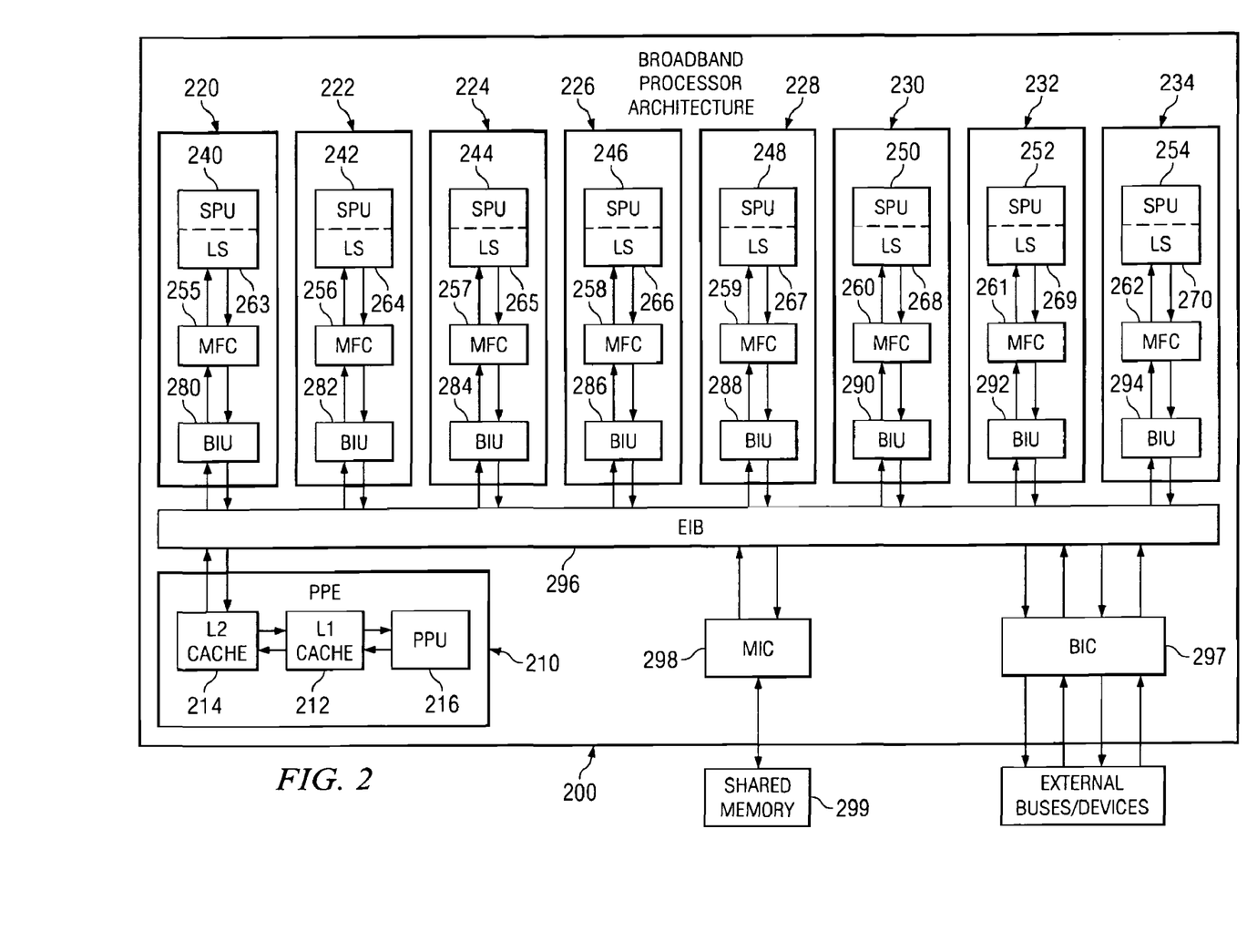
FIG. 2 is an exemplary block diagram of a data processing system in which exemplary aspects of an illustrative embodiment may be implemented.

FIG. 2 is an exemplary block diagram of a data processing system in which exemplary aspects of an illustrative embodiment may be implemented. The exemplary data processing system shown in FIG. 2 is an example of the Cell Broadband Engine (CBE) data processing system. While the CBE will be used in the description of the preferred embodiments of the present invention, the present invention is not limited to such, as will be readily apparent to those of ordinary skill in the art upon reading the following description.

As shown in FIG. 2, the CBE 200 includes a power processor element (PPE) 210 having a processor (PPU) 216 and its L1 and L2 caches 212 and 214, and multiple synergistic processor elements (SPEs) 220-234 that each has its own synergistic processor unit (SPU) 240-254, memory flow control 255-262, local memory or store (LS) 263-270, and bus interface unit (BIU unit) 280-294 which may be, for example, a combination direct memory access (DMA), memory management unit (MMU), and bus interface unit. A high bandwidth internal element interconnect bus (EIB) 296, a bus interface controller (BIC) 297, and a memory interface controller (MIC) 298 are also provided.

The CBE 200 may be a system-on-a-chip such that each of the elements depicted in FIG. 2 may be provided on a single microprocessor chip. Moreover, the CBE 200 is a heterogeneous processing environment in which each of the SPUs may receive different instructions from each of the other SPUs in the system. Moreover, the instruction set for the SPUs is different from that of the PPU, e.g., the PPU may execute Reduced Instruction Set Computer (RISC) based instructions while the SPU execute vectorized instructions.

The SPEs 220-234 are coupled to each other and to the L2 cache 114 via the EIB 296. In addition, the SPEs 220-234 are coupled to MIC 298 and BIC 297 via the EIB 296. The MIC 298 provides a communication interface to shared memory 299. The BIC 297 provides a communication interface between the CBE 200 and other external buses and devices.

The PPE 210 is a dual threaded PPE 210. The combination of this dual threaded PPE 210 and the eight SPEs 220-234 makes the CBE 200 capable of handling 10 simultaneous threads and over 128 outstanding memory requests. The PPE 210 acts as a controller for the other eight SPEs 220-234 which handle most of the computational workload. The PPE 210 may be used to run conventional operating systems while the SPEs 220-234 perform vectorized floating point code execution, for example.

The SPEs 220-234 comprise a synergistic processing unit (SPU) 240-254, memory flow control units 255-262, local memory or store 263-270, and an interface unit 280-294. The local memory or store 263-270, in one exemplary embodiment, comprises a 256 KB instruction and data memory which is visible to the PPE 210 and can be addressed directly by software.

The PPE 210 may load the SPEs 220-234 with small programs or threads, chaining the SPEs together to handle each step in a complex operation. For example, a set-top box incorporating the CBE 200 may load programs for reading a DVD, video and audio decoding, and display, and the data would be passed off from SPE to SPE until it finally ended up on the output display. At 4 GHz, each SPE 220-234 gives a theoretical 32 GFLOPS of performance with the PPE 210 having a similar level of performance. The memory flow control units (MFCs) 255-262 serve as an interface for an SPU to the rest of the system and other elements. The MFCs 255-262 provide the primary mechanism for data transfer, protection, and synchronization between main storage and the local storages 263-270. There is logically an MFC for each SPU in a processor. Some implementations can share resources of a single MFC between multiple SPUs. In such a case, all the facilities and commands defined for the MFC must appear independent to software for each SPU. The effects of sharing an MFC are limited to implementation-dependent facilities and commands.

In accordance with the illustrative embodiments, the SPEs 220-234 may implement SIMD engines having SIMD registers. The illustrative embodiments provide a compiler for optimizing executable code for execution on such SIMD engines in SPEs 220-234. In particular, the illustrative embodiments optimize the alignment of scalar operands in SIMD registers so that scalar operations may be performed using such SIMD registers with a minimum of shift instructions.

With the apparatus and method of the illustrative embodiments, a compiler is provided with an optimization engine that performs selective alignment of scalar operands in SIMD registers through insertion of shift instructions. The compiler parses source code and, for each statement in the program, generates an expression tree. The compiler inspects all storage inputs to scalar operations, if any, in the expression tree, i.e. the leaves, to determine their alignment in the SIMD registers. This alignment is propagated up the expression tree from the leaves.

When the alignments of two operands in the expression tree are the same, the resulting alignment is the shared value. When the alignments of two operands in the expression tree are different, at least one operand is shifted. For shifted operands, a shift operation is inserted in the expression tree. The executable code is then generated for the expression tree and shifts are inserted where indicated.

It is this executable code that may be distributed to the SPEs 220-234 for execution. Since the SPEs 220-234 are SIMD engines having SIMD registers, the executable code is optimized for performance of scalar operations using these SIMD engines and SIMD registers. In particular, through implementing the illustrative embodiments, those scalar operands that are already aligned may be identified and shifting of the aligned scalar operands may be avoided. Moreover, even for those operands that are not aligned, a subset of the operands need only be shifted rather than shifting all of the scalar operands. As a result, the number of shift operations for aligning scalar operands is minimized. Thus, processor cycles that would be required to align all of the scalar operands in a preferred slot of the SIMD registers are saved by the illustrative embodiments.

Figure 3:
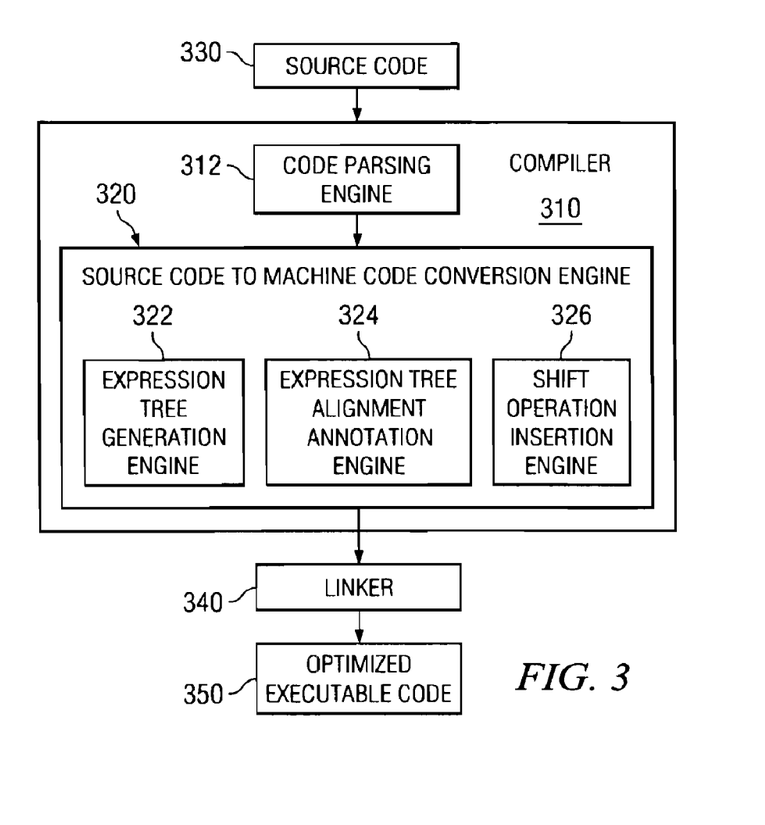
FIG. 3 is an exemplary block diagram of a compiler in accordance with one illustrative embodiment.

FIG. 3 is an exemplary block diagram of a compiler in accordance with one illustrative embodiment. As shown in FIG. 3, a compiler 310 is provided that includes a code parsing engine 312 and a source code to executable code conversion engine 320. The compiler 310 receives source code 330 as input which is parsed by code parsing engine 312. The parsed source code segments are provided to source code to executable code conversion engine 320 which converts the higher level source code representation into an executable code that is understandable by the data processing system. Such operations are generally known in the art and thus, a detailed explanation of the conversion from source code to executable code is not provided herein.

In addition to the generally known mechanisms for converting source code to executable code, the conversion engine 320 includes an expression tree generation engine 322, an expression tree alignment annotation engine 324 and a shift operation insertion engine 326. The elements 322-326 are used to implement the methodology of the illustrative embodiments on the parsed source code 330.

Specifically, the expression tree generation engine 322 generates, for each statement in the parsed source code 330, an expression tree. The generation of expression trees for statements in source code is generally known in the art and thus, a detailed explanation is not provided herein. Those of ordinary skill in the art are aware of the available mechanisms for generating expression trees.

With the illustrative embodiments, the generated expression tree is examined by the expression tree alignment annotation engine 324 to identify all storage inputs to scalar operations, i.e. the scalar operands for the scalar operations. The storage inputs may be determined by inspection of the expression tree and are the leaves of the tree, represented by a LOAD operation acting on an address expression. The compiler distinguishes between scalar and vector operations in the expression tree by use of different operations and symbolic register types. The compiler front end can distinguish in the source language between scalar and vector operations encoded by a programmer, and the optimizing component of the compiler can distinguish between scalar operations and vector operations which it may create by SIMDization or vectorization transformations.

The expression tree alignment annotation engine 324 determines the alignment of these scalar inputs, i.e. scalar operands, which would be the leaf nodes in the expression tree, in the SIMD registers of the SIMD engine. The alignment is discovered by inspection of the address expression in the leaf node. It may be a constant value, determined at compile time, or a run time value in which case it is assumed to be unknown. Scalars with unknown alignments can always be shifted to a preferred slot.

The determined alignment is propagated up the expression tree, by the expression tree alignment annotation engine 324, from node to node in order to determine where shift instructions should be inserted to align the scalar operands. In this way, the nodes of the expression tree are annotated with the alignment of the scalar operands of the scalar operations.

In annotating the expression tree with the alignment of the scalar operands in the SIMD registers, the expression tree alignment annotation engine 324 resolves differences between alignments of nodes by annotating nodes with shift operations. These shift operations serve to shift a subset of the scalar operands, e.g. at least one of two scalar operands, so that all of the scalar operands of a particular portion of the scalar operation are in alignment with regard to the SIMD registers.

Thus, for example, if two nodes in the expression tree are to be combined and have different alignments, a shift operation annotation is added to a node of at least one of the scalar operands so as to align it with the alignment of the other scalar operand node. The resultant node in the expression tree has the alignment of the two nodes after shifting. If the two nodes have the same alignment, then no shift operation annotation is necessary and the resultant node in the expression tree has the alignment of the two nodes. This process may be repeated as the alignments are propagated up the expression tree. After annotating the expression tree with the alignment information and shift operation annotations, the source code to execution code conversion engine 320 generates executable code for the expression tree.

There may be more than one way to choose an alignment and operand to shift. This choice can be made arbitrarily, in a simple compiler, or it may be made with reference to all other shifts within some given region of code, such as a loop, by means of an optimization process which attempts to find a minimum number of shifts within the region. For example, common sub-expressions of scalar operations may be determined and shift operations may be selected such that for some number of instances of the common sub-expression the same shift may be utilized.

Another possible technique is to use a shuffle operation to propagate the scalar to all positions in the register rather than choosing a single shift. This may be useful in cases where more than one alignment is desirable for a single scalar. When a scalar is propagated to all positions of a SIMD register, the expression node associated with that value is modified to reflect this new state, e.g. with a label indicating "this value is replicated at all locations," referred to as "all-loc" for short. This special value then never conflicts with any specific alignment as it is further propagated up the tree. For example, if there is an operation with two operands, one of which is "alignment at 4 byte" and the other is "all-loc," then there is no conflict at this operation. The alignment further propagated up is then "alignment at 4 byte."

Note also that there are values that are under control of the compiler and that can be expressly be generated as to reside at "all-loc". For example, any scalar constant in the program can be artificially replicated in all locations within an aligned 16-byte boundary so as to exhibit this desirable property. Also, there are several operations, especially operations generating immediate values in registers, that naturally reflect this "all-loc" property. Thus, the tree annotation engine understands these special instructions as well as the loads of these special scalar values that are under control of the compiler and amendable to being replicated in all locations within an aligned 16 byte boundaries.

In addition, the expression tree is provided to the shift operation insertion engine 326. The shift operation insertion engine 326 examines the annotated expression tree and inserts shift instructions into the executable code generated from the annotated expression tree. The optimized executable code, which has been optimized for scalar operations performed on SIMD engines, is provided to the linker 340 which links appropriate executable code modules to generate the optimized executable code 350 that is optimized for execution by SIMD processors, such as the SIMD engines of the SPEs in the Cell Broadband Engine data processing system.

Figure 4A:
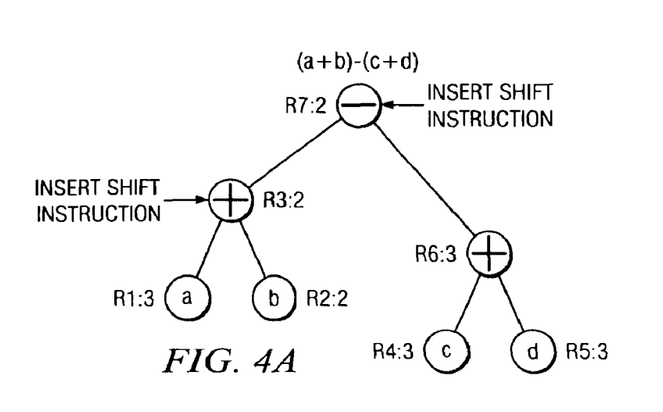
FIG. 4A is an exemplary diagram illustrating an expression tree in accordance with one illustrative embodiment.

FIG. 4A is an exemplary diagram illustrating an expression tree in accordance with one illustrative embodiment. In the example shown in FIG. 4A, it is assumed that the statement parsed by the compiler is the scalar operation "(a+b)−(c+d)" as a simple example to illustrate the operation of the illustrative embodiments. As shown in FIG. 4A, the resulting expression tree includes four leaf nodes, one for each of the scalar operands a, b, c and d. Additional nodes are provided that represent the computational operations to be performed on the scalar operands.

Each leaf node, corresponding to the scalar inputs or scalar operands, is annotated with its alignment in its corresponding SIMD register. For example, the nodes are annotated with the SIMD register identifier and corresponding slot in the SIMD register. As shown in FIG. 4A, based on the alignment annotations, it can be seen that the scalar operand a and the scalar operand b are not aligned, i.e. they are in different slots of their respective SIMD registers, e.g., slot 3 and slot 2. The scalar operand c and the scalar operand d are aligned, i.e. they are in the same slots of their respective SIMD registers, e.g., slot 3.

Thus, based on the alignment annotations, it can be seen that at least one of the scalar operands a or b needs to be shifted to be aligned with the other operand. One of these operands is selected for shifting, e.g., operand a, and its corresponding node is annotated with a shift operation. The resulting node, i.e. the summation node that is the parent of the leaf nodes for scalar operands a and b, has the same alignment as the alignment of the two leaf nodes after shifting, e.g., the result is placed in the second slot of the SIMD register used to store the result of the addition of a and b.

Since the alignments of the nodes representing the scalar operands c and d are already aligned, a shift operation is not necessary and thus, a shift operation annotation is not inserted into the expression tree. Furthermore, the resulting node, i.e. the summation node that is the parent of the leaf nodes for scalar operands c and d, has the same alignment as the alignment of the two leaf nodes for scalar operands c and d.

This process may be repeated as alignment annotations are propagated up from node to node in the expression tree. As a result, shift operation annotations are inserted only in those areas of the expression tree where they are needed to align scalar operands. Moreover, only a subset of the scalar operands need to be shifted in order to ensure alignment rather than having to shift all of the operands to a preferred slot.

Once the expression tree is annotated in this manner, the executable code for the expression tree may be generated. This executable code will include shift instructions that correspond to the shift operation annotations in the expression tree that operate to align scalar operands.

Figure 4B:
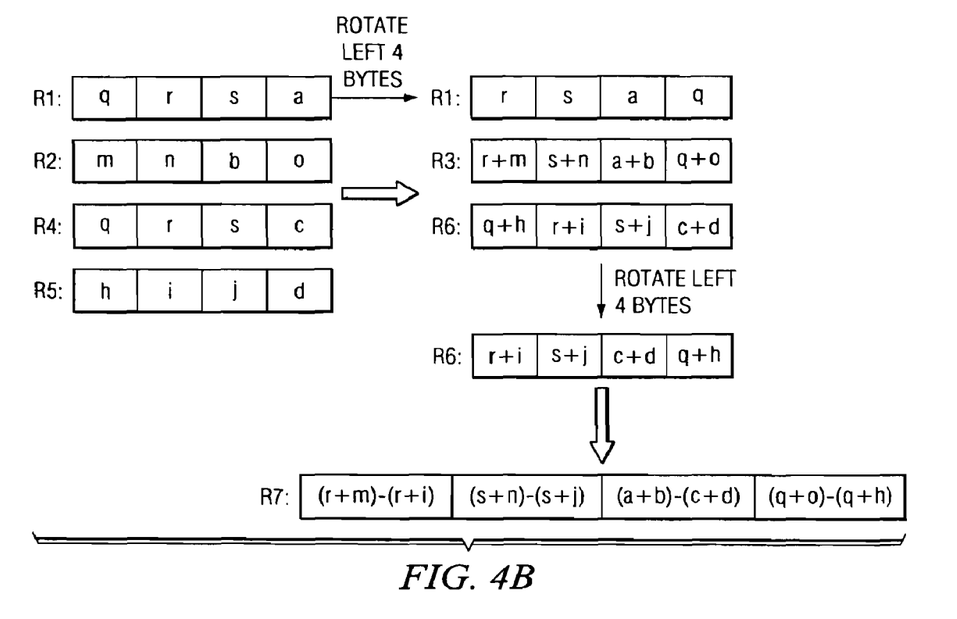
FIG. 4B is an exemplary diagram illustrating the operation of one illustrative embodiment when performing the operations of the expression tree in FIG. 4A within SIMD registers.

FIG. 4B is an exemplary diagram illustrating the operation of one illustrative embodiment when performing the operations of the expression tree in FIG. 4A within SIMD registers. In the example shown in FIG. 4B, SIMD registers having four slots are illustrated. While four slot SIMD registers are utilized in this example, the illustrative embodiments are not limited to such and any number of slots may be used with the SIMD registers without departing from the spirit and scope of the present invention.

As shown in FIG. 4B, when the first operand a is loaded into the SIMD register R1, the scalar operand a is loaded into slot 3 of the SIMD register R1. Along with the scalar operand a, other values are loaded into the SIMD register R1 that are not used with this particular scalar operation. These additional values are present because the SIMD register R1 is designed to store multiple data values, e.g., vector values, and must receive enough data values to fill all of its slots. With regard to scalar operations, these additional values are computed by the processor when performing the scalar operations, but do not contribute to the computation performed by the scalar expression.

Similarly, scalar operand b is loaded into slot 2 of SIMD register R2. Scalar operands c and d are loaded into slot 3 of SIMD registers R4 and R5, respectively. The difference in alignment of scalar operand b is due to differences in its alignment in storage, since the load operations move aligned data from storage to register without any reorganization.

In order for the scalar operands a and b to be combined, at least one of the operands must be shifted to be aligned with the other operand. In the depicted example, operand a is shifted, such as by a rotation operation, left one slot such that operand a is now in slot 2 of SIMD register R1. The values in SIMD register R1 and SIMD register R2 may be combined in a similar manner as described with reference to FIGS. 1A-1C above. The resulting values are stored in a third SIMD register R3. As shown in FIG. 4B, the result of the addition of scalar operands a and b is stored in slot 2 of the SIMD register R3.

Since scalar operands c and d are already aligned, they may simply be combined without any shifting of the operands in the SIMD registers R4 and R5. The resulting values are stored in the SIMD register R6. As shown in FIG. 4B, the result of combining scalar operand c and scalar operand d is stored in slot 3 of the SIMD register R6.

Now, the values in SIMD register R3 and SIMD register R6 need to be combined in order to complete the scalar operation. However, the resultant value (a+b) is not aligned with the resultant value (c+d). As a result, one of these values must be shifted in its respective SIMD register to be in alignment with the other value. In the depicted example, the value (c+d) is shifted left, such as by a rotation operation, by one slot so that it is now in slot 2 of SIMD register R6. The values in the two SIMD registers R3 and R6 may then be combined in the same manner as described above with regard to FIGS. 1A-1C. The resulting values are stored in SIMD register R7. As shown in FIG. 4B, the result of subtracting (c+d) from (a+b) is stored in slot 2 of SIMD register R7.

It should be appreciated that with the known solution to misalignment of scalar operands in SIMD registers, in the above example, four shift operations would be required to shift all of the scalar operands to a preferred slot, e.g., slot 0. By use of the illustrative embodiments, the number of shift operations required to perform the scalar operation using SIMD registers is reduced to only two. As a result, processor cycles are conserved.

Figure 5:
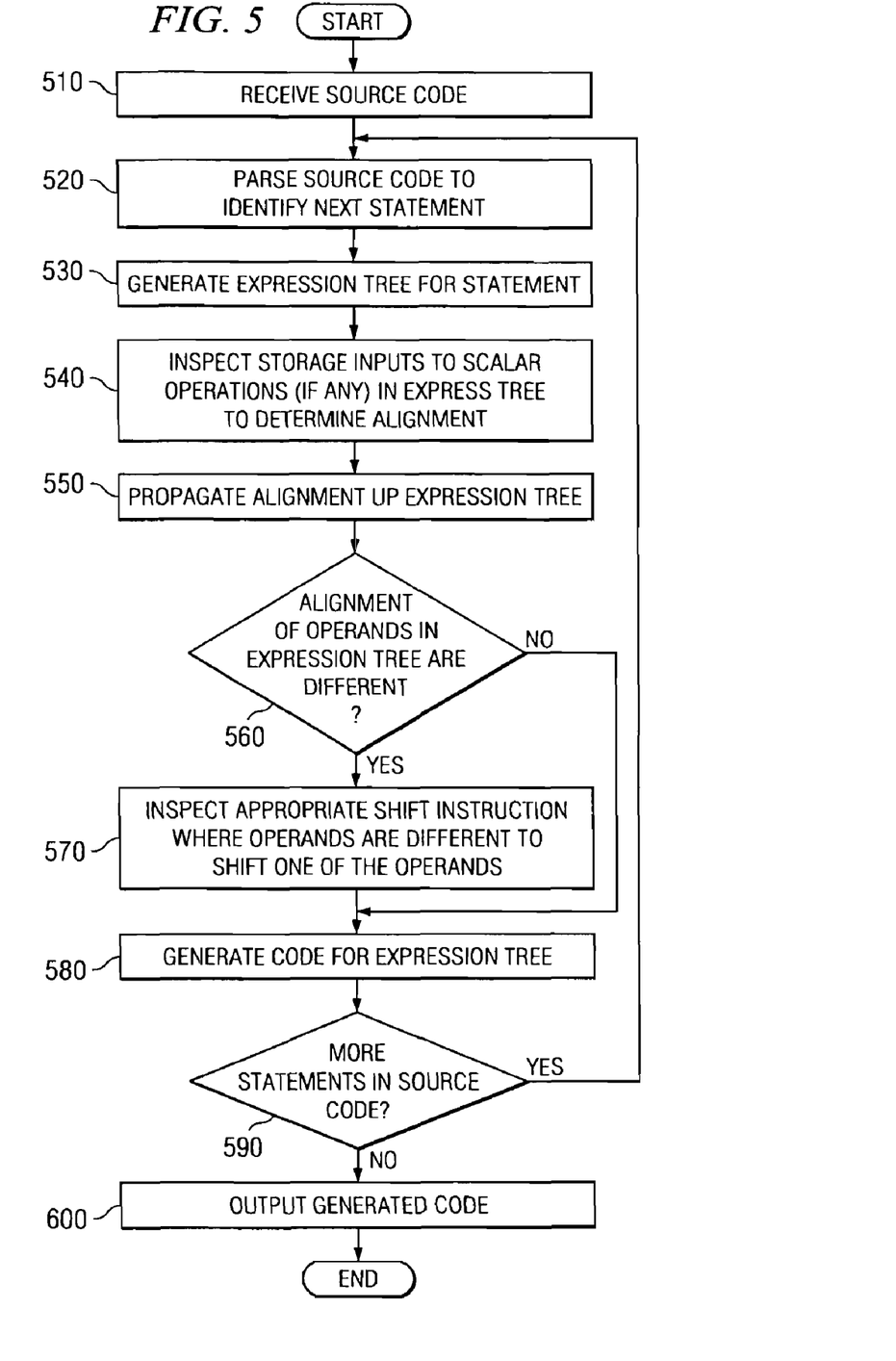
FIG. 5 is a flowchart outlining an exemplary operation in accordance with one illustrative embodiment.

FIG. 5 is a flowchart outlining an exemplary operation in accordance with one illustrative embodiment. It will be understood that each block of the flowchart illustration, and combinations of blocks in the flowchart illustration, can be implemented by computer program instructions. These computer program instructions may be provided to a processor or other programmable data processing apparatus to produce a machine, such that the instructions which execute on the processor or other programmable data processing apparatus create means for implementing the functions specified in the flowchart block or blocks. These computer program instructions may also be stored in a computer-readable memory or storage medium that can direct a processor or other programmable data processing apparatus to function in a particular manner, such that the instructions stored in the computer-readable memory or storage medium produce an article of manufacture including instruction means which implement the functions specified in the flowchart block or blocks.

Accordingly, blocks of the flowchart illustration support combinations of means for performing the specified functions, combinations of steps for performing the specified functions and program instruction means for performing the specified functions. It will also be understood that each block of the flowchart illustration, and combinations of blocks in the flowchart illustration, can be implemented by special purpose hardware-based computer systems which perform the specified functions or steps, or by combinations of special purpose hardware and computer instructions.

The operation outlined in FIG. 5 may be performed by a compiler of source code. The compiler operates to parse source code, identify scalar operations, identify alignments of scalar operands of the scalar operations, and insert appropriate shift instructions to ensure alignment of scalar operands. It will be understood by one skilled in the art that the steps described in FIG. 5 can be modified so that they are performed separately in the framework of an optimizing compiler comprising separate front end, optimizer and code generation phases.

As shown in FIG. 5, the operation starts with the compiler receiving source code to be compiled (step 510). The source code is parsed to identify a next statement in the source code (step 520). An expression tree is generated for the statement (step 530). Storage inputs to scalar operations in the expression tree are then inspected to determine their alignments (step 540). The alignments are propagated up the expression tree (step 550).

A determination is made as to whether the alignment of the operands in the expression tree are different (step 560). If so, then an appropriate shift instruction annotation is inserted into the expression tree where the operands are different in order to shift a subset of the operands (step 570). Code for the expression tree is then generated (step 580). As described above, this may include the insertion of shift instructions in conformance with the shift instruction annotations of the expression tree.

A determination is then made as to whether there are additional statements in the source code to process (step 590). If so, the operation returns to step 520 where the next statement in the source code is identified and the operation is repeated. If no more statements need to be processed, the generated executable code is output (step 600) and the operation terminates.

Thus, the illustrative embodiments provide a mechanism for aligning scalar operands for performance of scalar operations using SIMD registers. The illustrative embodiments minimize the number of shift operations that are required for ensuring alignment of the scalar operations by using an expression tree and propagating alignment information up the expression tree. In so doing, only selective shifting of scalar operands is performed rather than requiring that all scalar operands be shifted to a designated preferred slot of the SIMD registers.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a data processing system comprising a processor, for performing a scalar operation, comprising:
    identifying, by the processor, the scalar operation in source code;
    generating, by the processor, an expression tree for the scalar operation, wherein the expression tree has leaf nodes corresponding to scalar operands of the scalar operation;
    determining, by the processor, an alignment of the scalar operands in respective registers that store the scalar operands such that all of the scalar operands of the scalar operation are aligned with each other;
    propagating, by the processor, the alignment of the scalar operands up the expression tree;
    annotating, by the processor, the expression tree based on the propagation of the alignment of the scalar operands up the expression tree, wherein annotating the expression tree based on the propagation of the alignment comprises annotating selected nodes of the expression tree to identify shift operations to be performed with respect to the selected nodes, wherein the shift operations are determined with reference to all other shift operations within a given region of the source code in which all of the shift operations are considered by means of an optimization process which finds a minimum number of the shift operations within the given region of the source code such that all of the scalar operands of the scalar operation are aligned with each other, wherein the optimization process determines common sub-expressions of scalar operations, and wherein the shift operations are selected such that for a number of instances of the common sub-expressions a same shift operation is utilized; and
    generating, by the processor, executable code for the scalar operation based on the expression tree and the alignment of all of the scalar operands, wherein generating the executable code for the scalar operation includes inserting, by the processor, shift instructions into the executable code based on the alignment of all of the scalar operands.

2. The method of claim 1, wherein the selected nodes are nodes where values associated with two or more child nodes in the expression tree are to be combined and the values have different alignments in their respective registers.

3. The method of claim 2, wherein values of the selected nodes have alignments in their respective resultant registers corresponding to an alignment of the two or more child nodes after shifting is performed.

4. The method of claim 1, wherein at least one of the shift operations is a shuffle shift operation that propagates a scalar operand to all positions in a respective register such that the scalar operand may be used with, more than one desired alignment.

5. The method of claim 1, wherein the shift instructions that are inserted into the executable code are one of rotation shift instructions or shuffle shift instructions.

6. A computer program product comprising a non-transitory computer readable recordable-type medium having a computer readable program recorded thereon, wherein the computer readable program, when executed on a computing device, causes the computing device to:
    identify a scalar operation in source code;
    generate an expression tree for the scalar operation, wherein the expression tree has leaf nodes corresponding to scalar operands of the scalar operation;
    determine an alignment of the scalar operands in respective registers that store the scalar operands such that all of the scalar operands are aligned with each other;
    propagate the alignment of the scalar operands up the expression tree;
    annotate the expression tree based on the propagation of the alignment of the scalar operands up the expression tree, wherein the computer readable program causes the computing device to annotate the expression tree based on the propagation of the alignment by annotating selected nodes of the expression tree to identify shift operations to be performed with respect to the selected nodes, wherein the shift operations are determined with reference to all other shift operations within a given region of the source code in which all of the shift operations are considered by means of an optimization process which finds a minimum number of the shift operations within the given region of the source code such that all of the scalar operands of the scalar operation are aligned with each other, wherein the optimization process determines common sub-expressions of scalar operations, and wherein the shift operations are selected such that for a number of instances of the common sub-expressions a same shift operation is utilized; and
    generate executable code for the scalar operation based on the expression tree and the alignment of all of the scalar operands, wherein generating the executable code for the scalar operation includes inserting shift instructions into the executable code based on the alignment of all of the scalar operands.

7. The computer program product of claim 6, wherein the selected nodes are nodes where Values associated with two or more child nodes in the expression tree are to be combined and the values have different alignments in their respective registers.

8. The computer program product of claim 7, wherein values of the selected nodes have alignments in their respective resultant registers corresponding to an alignment of the two or more child nodes after shifting is performed.

9. The computer program product of claim 6, wherein at least one of the shift operations is a shuffle shift operation that propagates a scalar operand to all positions in a respective register such that the scalar operand may be used with more than one desired alignment.

10. The computer program product of claim 6, wherein the shift instructions that are inserted into the executable code are one of rotation shift instructions or shuffle shift instructions.

11. An apparatus for performing a scalar operation, comprising:
a processor; and
a memory coupled to the processor, wherein the memory contains instructions which, when executed by the processor, cause the processor to:
identify the scalar operation in source code;
generate an expression tree for the scalar operation, wherein the expression tree has leaf nodes corresponding to, scalar operands of the scalar operation;
determine an alignment of the scalar operands in respective registers that store the scalar operands such that all of the scalar operands are aligned with each other;
propagate the alignment of the scalar operands up the expression tree;
annotate the expression tree based on the propagation of the alignment of the scalar operands up the expression tree, wherein the instructions cause the processor to annotate the expression tree based on the propagation of the alignment by annotating selected nodes of the expression tree to identify shift operations to be performed with respect to the selected nodes, wherein the shift operations are determined with reference to all other shift operations within a given region of the source code in which all of the shift operations are considered by means of an optimization process which finds a minimum number of the shift operations within the given region of the source code such that all of the scalar operands of the scalar operation are aligned with each other, wherein the optimization process determines common sub-expressions of scalar operations, and wherein the shift operations are selected such that for a number of instances of the common sub-expressions a same shift operation is utilized; and
generate executable code for the scalar operation based on the expression tree and the alignment of all of the scalar operands, wherein generating the executable code for the scalar operation includes inserting shift instructions into the executable code based on the alignment of all of the scalar operands.

12. The apparatus of claim 11, wherein the selected nodes are nodes where values associated with two or more child nodes in the expression tree are to be combined and the values have different alignments in their respective registers.

13. The apparatus of claim 12, wherein values of the selected nodes have alignments in their respective resultant registers corresponding to an alignment of the two or more child nodes after shifting is performed.

14. The apparatus of claim 11, wherein at least one of the shift operations is a shuffle shift operation that propagates a scalar operand to all positions in a respective register such that the scalar operand may be used with more than one desired alignment.

15. The apparatus of claim 11, wherein the shift instructions that are inserted into the executable code are one of rotation shift instructions or shuffle shift instructions.

* * * * *